Figure 1:
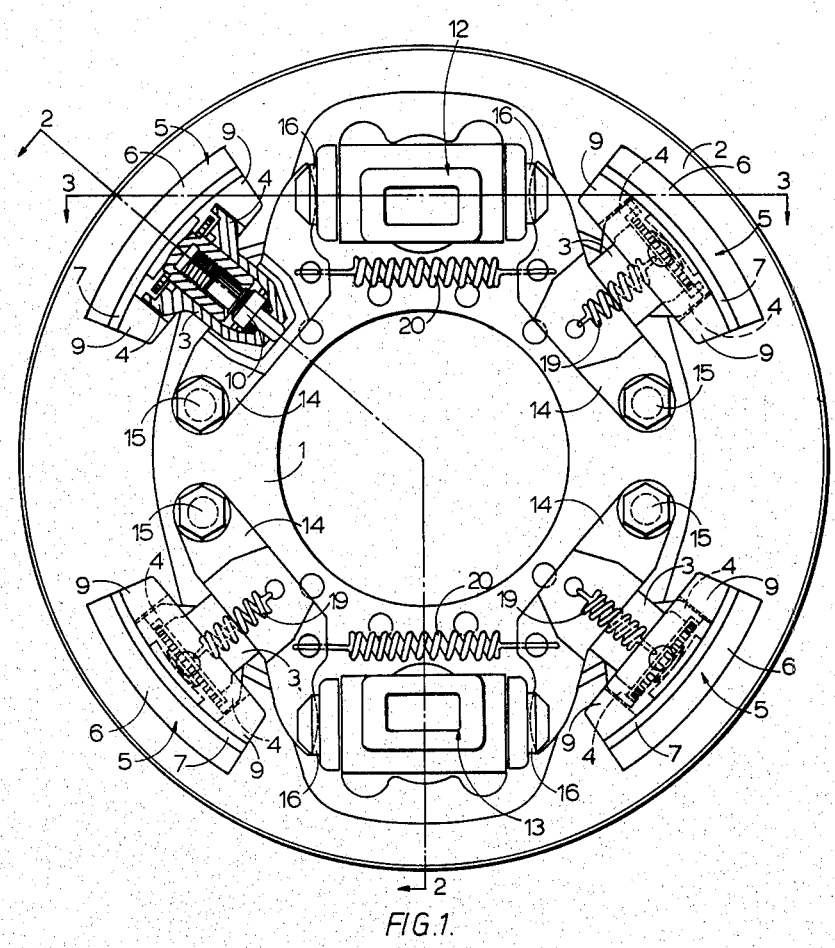

United States Patent [19]
Ingram et al.

[11] 4,350,230
[45] Sep. 21, 1982

[54] DRUM BRAKES FOR VEHICLES

[75] Inventors: Brian Ingram, Balsall Common; David A. Harries, Solihull, both of England; Ramamurthy Natarajan, Madras, India

[73] Assignee: Girling Limited, Birmingham, England

[21] Appl. No.: 184,139

[22] Filed: Sep. 4, 1980

Related U.S. Application Data

[63] Continuation of Ser. No. 14,261, Feb. 22, 1979, abandoned.

[30] Foreign Application Priority Data

Feb. 22, 1978 [GB] United Kingdom ................ 6974/78

[51] Int. Cl.³ ........................................... F16D 51/12
[52] U.S. Cl. ................................... 188/79; 188/335; 188/343; 188/362
[58] Field of Search ................... 188/76, 79, 328, 335, 188/343, 362, 364, 365, 340, 75; 192/26, 99 B

[56] References Cited

U.S. PATENT DOCUMENTS

| | | | |
|---|---|---|---|
| 1,238,305 | 8/1917 | Lane et al. | 188/79 |
| 1,663,147 | 3/1928 | Spotz | 188/362 |
| 2,051,088 | 8/1936 | Kittle et al. | 188/335 X |
| 2,139,197 | 12/1938 | McKone | 188/335 |
| 2,148,776 | 2/1939 | Sauzedde | 188/335 X |
| 2,684,131 | 7/1954 | Butterfield | 188/364 X |
| 3,162,273 | 12/1964 | Burnett | 188/343 X |
| 3,390,745 | 7/1968 | Fawick | 188/365 X |
| 3,536,168 | 10/1970 | Newstead | 188/79 |

FOREIGN PATENT DOCUMENTS

| | | | |
|---|---|---|---|
| 174307 | 3/1953 | Austria | 188/362 |
| 700803 | 1/1931 | France | 188/362 |

*Primary Examiner*—George E. A. Halvosa
*Attorney, Agent, or Firm*—Scrivener, Clarke, Scrivener and Johnson

[57] ABSTRACT

A drum brake is disclosed in which at least two, and preferably four, friction pad assemblies are symmetrically arranged with respect to the drum. The pad assemblies are slidably guided for movement towards and away from the drum in a substantially radial direction on drag-taking abutments in a relatively stationary drag-taking member, and the pad assemblies are applied to the drum by levers upon which actuators act.

2 Claims, 13 Drawing Figures

DRUM BRAKES FOR VEHICLES

This application is a continuation of application Ser. No. 014,261, filed Feb. 22, 1979, now abandoned.

This invention relates to a drum brake for vehicles of the kind in which friction members are adapted to be applied to the internal face of a rotatable drum by actuating means.

In known brakes of the kind set forth the friction members usually comprise a pair of arcuate shoes which are mounted on a back plate and which are adapted to be urged into engagement with the drum by an actuator for separating adjacent shoe ends, or by a pair of actuators, each acting on an actuated end of one of the shoes, and the drag on the shoes when the brake is applied is taken by abutment means on the back plate with which the non-actuated shoe ends engage.

According to our invention in a drum brake of the kind set forth for vehicles the friction members comprise at least two friction pad assemblies which are symmetrically arranged with respect to the drum and which are slidably guided for movement towards and away from the drum in a substantially radial direction on drag-taking abutments in a relatively stationary drag-taking member, and the pad assemblies are adapted to be applied to the drum by levers upon which the actuating means act.

Preferably at least two pairs of friction pad assemblies are provided with the pad assemblies spaced angularly with respect to each other.

Applying individual friction pad assemblies directly to the drum in substantially radial directions has the advantage of providing a brake which is less sensitive to fade and is therefore more stable. Such a brake is more comparable to a disc brake but with the ability to operate in a drum where large swept areas can be obtained to give longer lining and drum life. By providing at least four pad assemblies which are applied to the drum substantially in a radial direction subjects the drum to a substantially uniform loading which, in turn, reduces the deflection of the drum in comparison with those normally associated with conventional shoe-drum brakes having two arcuate shoes.

Each lever may act on an individual friction pad assembly with each lever acting at an intermediate point in its length on a thrust member for applying its respective friction pad assembly to the drum.

Alternatively two levers are provided and each lever is adapted to act on an adjacent pair of four friction pad assemblies, each lever acting on a thrust transmitting member which acts on the friction pad assemblies of that pair, with a strut being interposed between the lever and the thrust transmitting member at intermediate points in their lengths.

Conveniently the pad assemblies are applied to the drum by an operating mechanism which acts between adjacent ends of a pair of levers.

The or each actuating means may be fluid-pressure operated and may comprise an expander of the type in which a wedge is withdrawn to separate the inner ends of a pair of tappets which are guided for axial sliding movement in bores in a housing and of which the outer ends act between the adjacent ends of the levers of one pair. Alternatively the actuating means may comprise a cam carried by a cam shaft which is journalled for rotation in the drag-taking member.

The drag-taking abutments are arranged to guide the friction pad assemblies with respect to the drum only in a radial direction thereby substantially avoiding a servo or self-energising action when the brake is applied. This ensures that the performance of the brake remains substantially constant irrespective of the direction of drum rotation.

Preferably each thrust member is embodied in, or combined with, a slack adjuster which automatically advances the pad assembly towards the drum to compensate for wear of the friction lining material.

Figure 2:
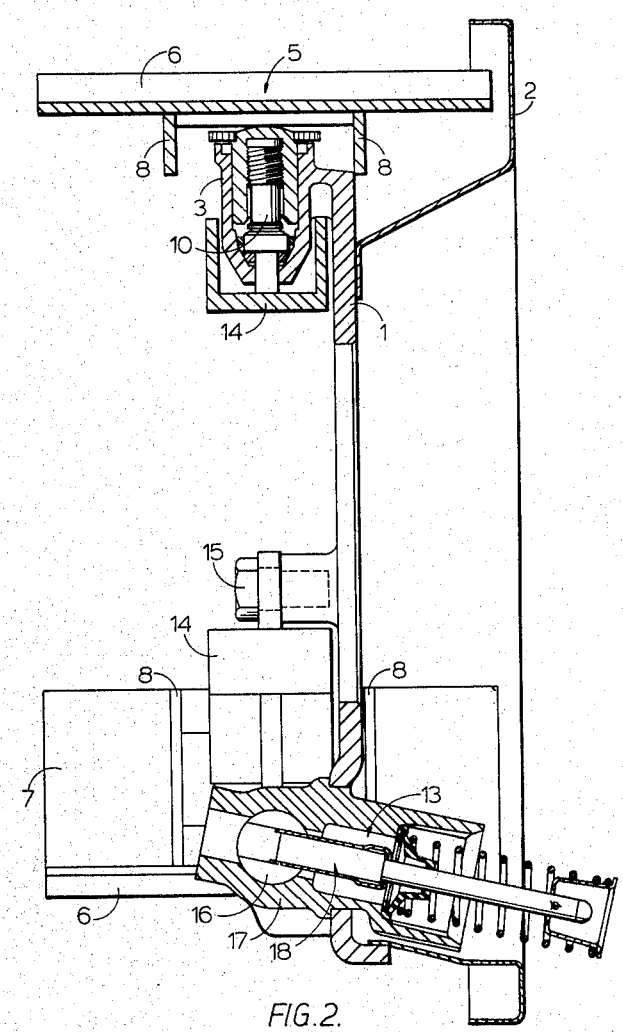
Figure 3:
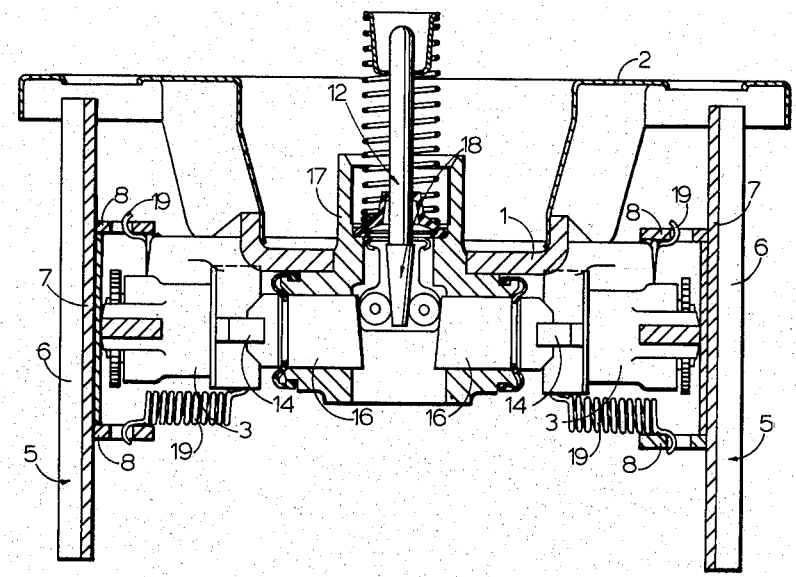
Figure 4:
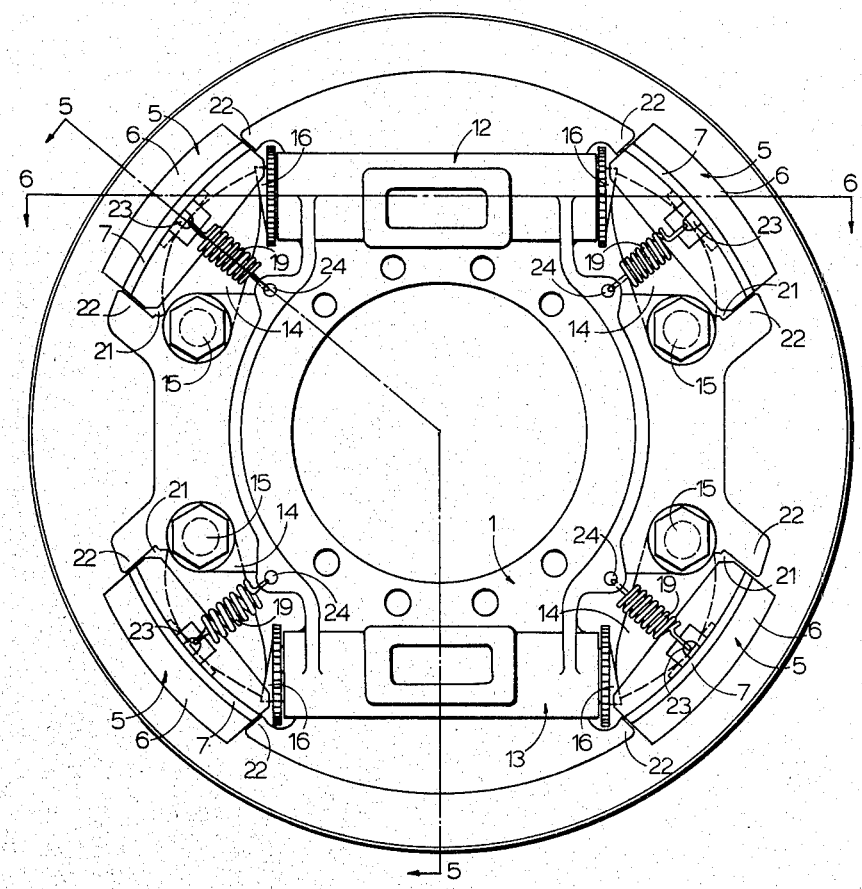
Figure 5:
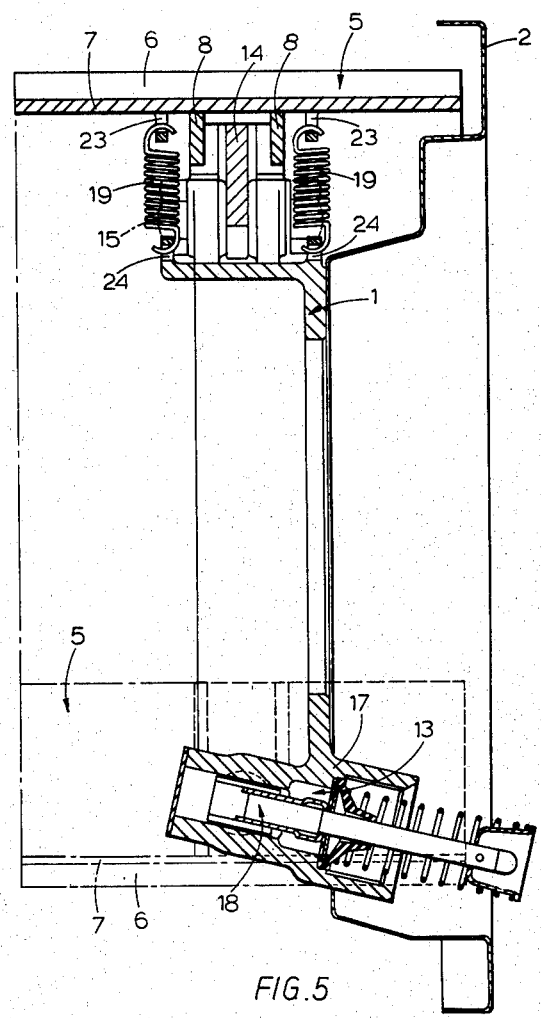
Figure 6:
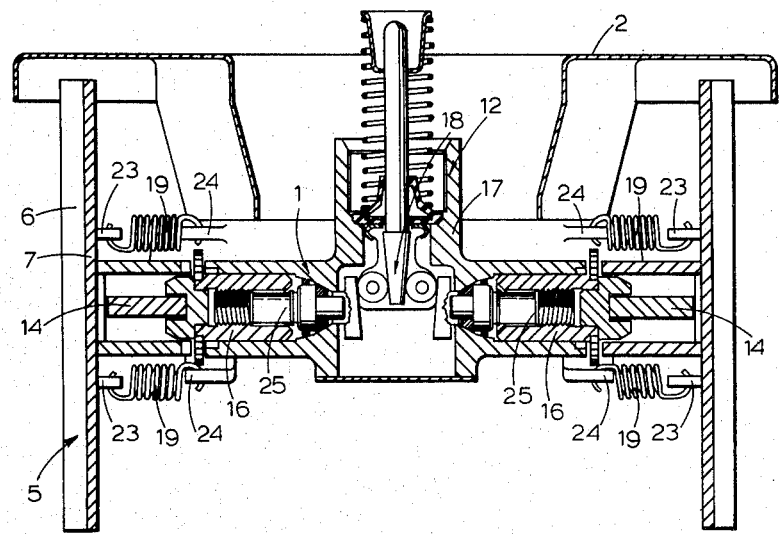
Figure 7:
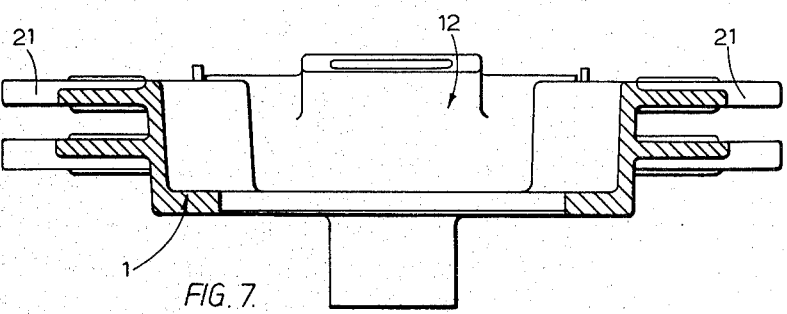
Figure 8:
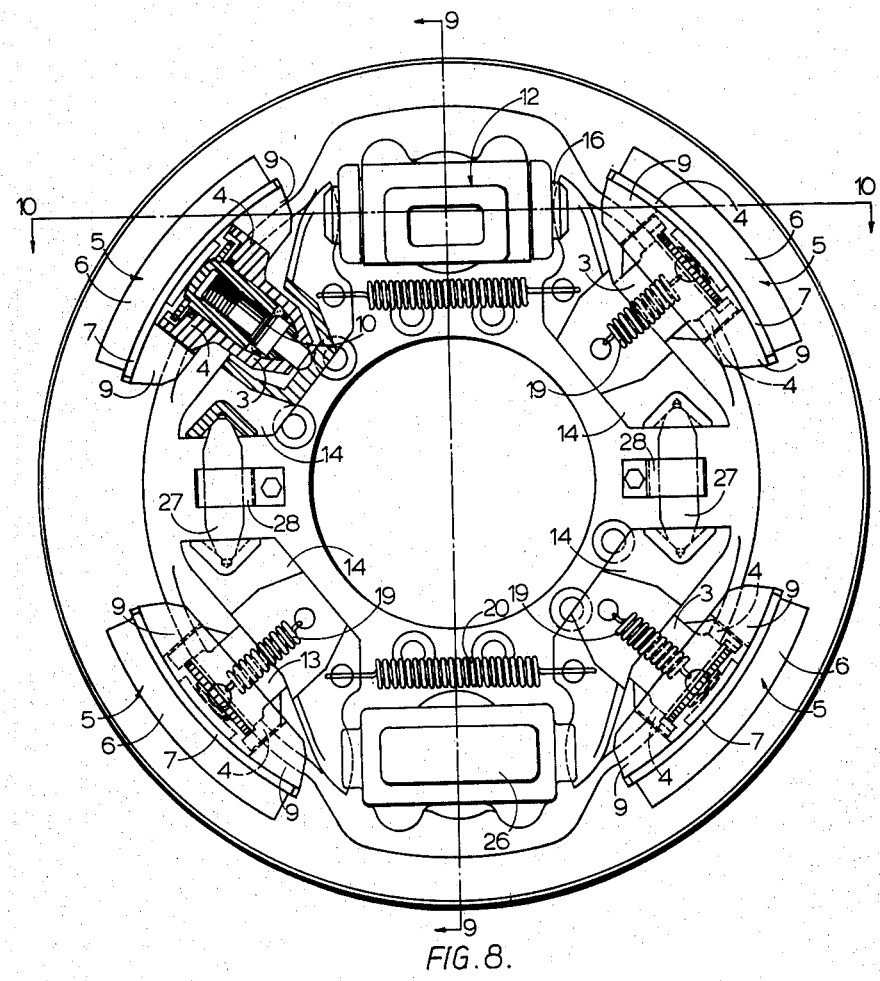
Figure 9:
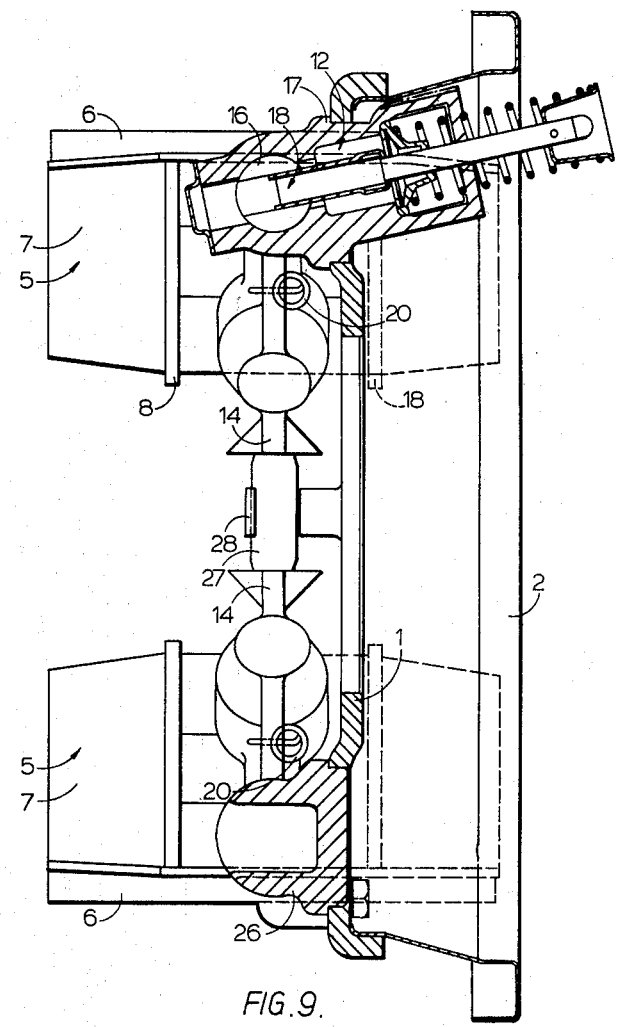
Figure 10:
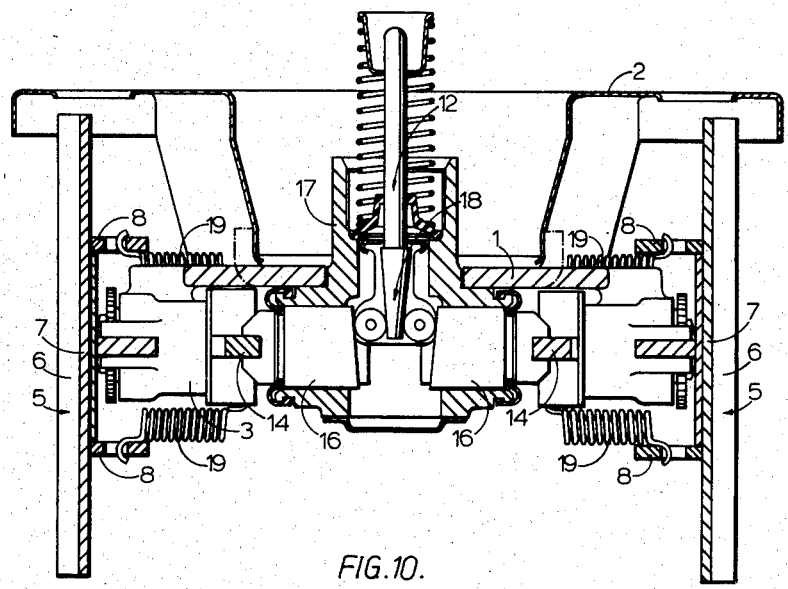
Figure 11:
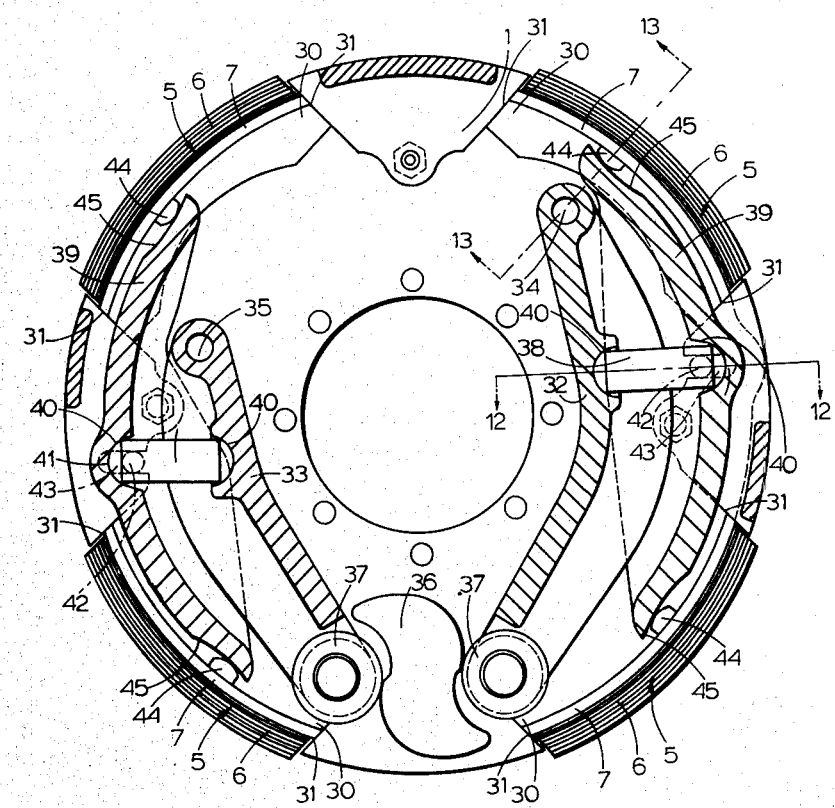
Figure 12:
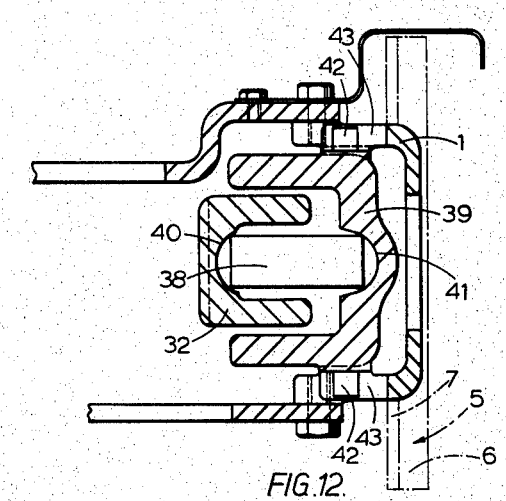
Figure 13:
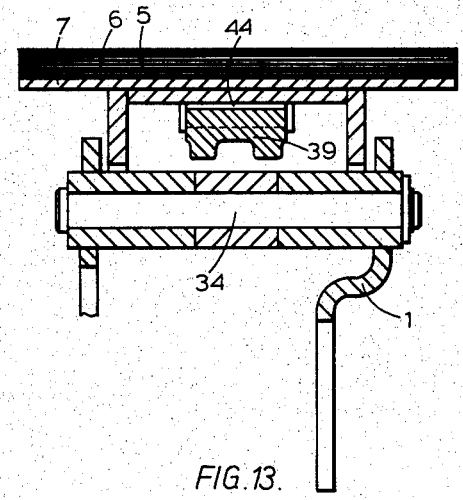

Four embodiments of our invention are illustrated in the accompanying drawings in which:

FIG. 1 is a plan view of a drum brake for a vehicle;
FIG. 2 is a section on the line 2—2 of FIG. 1;
FIG. 3 is a section on the line 3—3 of FIG. 1;
FIG. 4 is a plan view of another drum brake;
FIG. 5 is a section on the line 5—5 of FIG. 4;
FIG. 6 is a section on the line 6—6 of FIG. 4;
FIG. 7 is a transverse section through the drag-taking member of the brake;
FIG. 8 is a plan view of another drum brake;
FIG. 9 is a section on the line 9—9 of FIG. 8;
FIG. 10 is a section on the line 10—10 of FIG. 8;
FIG. 11 is a plan view of yet another brake;
FIG. 12 is a section on the line 12—12 of FIG. 11; and
FIG. 13 is a section on the line 13—13 of FIG. 11.

The drum brake illustrated in FIGS. 1 to 3 of the accompanying drawings comprises a drag-taking member 1 in the form of a casting or forging which is mounted on a stationary part adjacent to the wheel of a vehicle within a dirt shield 2. The drag-taking member 1 has four symmetrically arranged angularly spaced radial cylinders 3 provided at their forward ends with circumferentially spaced arms which act as drag-taking abutment surfaces 4.

A friction pad assembly 5 for engagement with a rotatable drum (not shown) is guided for movement towards and away from the drum in a radial direction, on the abutment surfaces 4 of each pair of arms which take the drag on the pad assembly when the brake is applied. Each friction pad assembly 5 is of arcuate outline and comprises a lining 6 of friction material carried by a shoe 7 which is provided with a pair of axially spaced webs 8. Lugs 9, disposed between the webs 8 at opposite ends of the shoes 6, engage directly with the abutment surfaces 4.

Each friction pad assembly 5 is applied to the drum by means of a thrust transmitting assembly 10 which includes an automatic slack adjuster and is guided for sliding movement in a radial direction in each cylinder 3.

The thrust assemblies 10 are urged radially outwards to apply the brake by means of fluid-pressure pressure-operable actuators 12 and 13 which act on the thrust members through levers 14 having central portions of channel section. The actuators 12, 13 are mounted at diametrically opposed points on the drag-taking member 1, each being spaced by an equal distance from an adjacent thrust assembly 10. Each actuator 12, 13 acts between adjacent ends of a pair of levers 14, of which the other ends are connected to the drag-taking member 1 by pivotal connections 15, and the levers 14, in turn act at intermediate points in their lengths on the inner ends of the thrust member 10, of which the outer ends act on the flanges of the shoes 7. As illustrated each actuator comprises a wedge-expander of known floating type including a pair of tappets 16 which are guided for movement in a housing 17 which is mounted on the drag-taking member 1 with the tappets 16 engaging with the outer ends of a pair of levers 14. A wedge expander assembly 18 is urged inwardly by fluid-pressure operable means, suitably means operated by compressed air, to urge the tappets 16 away from each other. This separates the levers 14 at their outer ends so that the levers 14 move angularly about the pivotal connections 15 to move the thrust assemblies 10 radially to apply the friction pad assemblies 5 to the drum.

Both actuators 12 and 13 are operated simultaneously so that all four pad assemblies 5 are applied to the drum simultaneously, and the drum is subjected to a substantially uniform loading.

The drag on the pad assemblies 5 is taken by the corresponding arms 4 at the trailing ends of cylinders 3, according to the direction of drum rotation.

At the termination of a brake application, the pad assemblies 5 are retracted radially into retracted positions in engagement with the free ends of the arms by means of tension return springs 19 which are coupled between the webs 8 and the levers 14, and the levers 14 of each pair are urged towards each other by return springs 20 which are connected between them.

In the brake illustrated in FIGS. 4–7, the pad assemblies 5 are located in gaps 21 in the drag-taking member, with the pad assemblies 5 guided between pairs of circumferentially spaced radial arms 22 defining the gaps and of which the inner faces define drag-taking abutment surfaces.

In this construction the cylinders 3 and the thrust members 10 are omitted and the levers 14, which are shorter, act directly on the pad assemblies 5. The return springs 19 are coupled between anchorages 23 on the shoes 7 and anchorages 24 on the drag-taking member 1, and the return springs 20, the cylinders 3, and the thrust members 10 are also omitted.

Automatic slack adjusters 25 for the pad assemblies 5 are incorporated in the tappets 16 of the actuators, and the housings 17 of the actuators 12, 13 are integral with the drag-taking member 1.

In the application of the brake the drag on each pad assembly 5 is taken by the abutment surface at the forward end of the pad assembly 5.

The construction and operation of the brake illustrated in FIGS. 4–7 is otherwise the same as that of FIGS. 1–3 and corresponding reference numerals have been applied to corresponding parts.

In the brake illustrated in FIGS. 8–10 the actuator 13 is replaced by an abutment block 26 and all the pivotal connections 15 between the four levers 14 and the drag-taking member 1 are omitted. The ends of the levers 14 which are remote from the housing 17 and from the abutment block 26 are articulated together by struts or dollies 27 with opposite ends of which the levers 14 have rocking engagements. Each strut 27 is mounted in a steady 28 which partially encircles the strut 27 and retains the strut 27 against movement in a radial direction. The steadies 28 are however arranged to permit the struts 27 to move in a generally circumferential direction as dictated by the levers 14.

To apply the brake, operation of the single actuator 12 moves the adjacent pair of levers 14 circumferentially and they tend to rock about engagements with the struts 27.

The circumferential force is transmitted through the struts 27 to the other levers 14 which pivot on the abutment block 26. Thus all four pad assemblies 5 are applied to the drum simultaneously.

The construction and operation of the brake of FIGS. 8–10 is otherwise the same as that of FIGS. 1–3 and corresponding reference numerals have again been applied to corresponding parts.

In the brakes described above, by using a wedge expander of the floating type we ensure that the loads applied to the levers are equal. Thus the loads applied to the individual friction pad assemblies 5 are equal.

In the brake illustrated in FIGS. 11–13 the four pad assemblies 5 are located in gaps 30 in the drag-taking member 2, with the pad assemblies 5 guided between circumferentially spaced pairs of drag-taking abutment surfaces 31 which define the gaps 30.

A pair of levers 32, 33 of generally channel section and of curved outline, are pivotally connected at their inner ends to the drag-taking member 1 by pivotal connections 34, 35 respectively. At their outer, adjacent ends, the levers 32,33 are adapted to be separated by cam 3,6 of generally 'S' outline which engages with rollers 37 which are journalled for rotation between spaced flanges of the levers 32, 33.

At an intermediate point in its length each lever 32, 33 acts on an adjacent pair of the four pad assemblies 5 to apply them to the drum simultaneously. As illustrated each lever 32, 33 acts on the pad assemblies 5 of one pair through a strut 38, and a thrust-transmitting member 39 which is of arcuate outline and of channel section. The struts 38 have rocking engagements at opposite ends in hemi-spherical or semi-cylindrical recesses 40 in the levers 32 and 33 and the members 39, and the members 39 are each provided with a pair of trunnions 42 which project from side flanges of the members and are guided to slide in radial slots 43 in the drag-taking member 1, which is also of U outline. The thrust-transmitting members 39 are also provided adjacent to opposite ends with recessed portions 45 which act on the friction pad assemblies 5 through semi-cylindrical projections 44 on the backing plates 7 which are arranged substantially at the centres of pressure of the friction pad assemblies 5.

The brake is applied by rotation of the cam 36, suitably by fluid-pressure operated means (not shown), to separate the outer ends of the levers and move the levers 32, 33 angularly about the pivotal connections 34,35 in directions away from each other. This transmits force to the four friction pad assemblies 5 simultaneously, through the struts 38 and the force transmitting members 39, to apply them to the rotatable drum.

Guiding the thrust-transmitting members in the radial slots 43 and providing the projections 44 ensures that the thrust from the struts 38 is distributed equally between the friction pad assemblies 5 of both pairs.

The construction and operation of the brake of FIGS. 11–13 is otherwise the same as that of the brakes described above, and corresponding reference numerals have been applied to corresponding parts.

In a modification the cam 36 can be replaced by a wedge-expander with adjustable tappets, similar to that incorporated in the brakes of FIGS. 4–7. This would ensure that equal loads would be applied to the levers 32, 33.

In another modification the cam 36 could be mounted in a bearing which has a degree of freedom in a circumferential direction. This would also ensure that equal loads would be applied to the levers 32,33. A similar result can be achieved when using the existing cam 36 but providing the pivotal connections 34,35 in a sliding plate.

We claim:

1. A drum brake for a vehicle comprising a drag-taking member, four separate friction pad assemblies mounted on said drag-taking member for engagement with a rotatable drum, radially arranged drag-taking abutments on said drag-taking member, guide surfaces on said pad assemblies for cooperation with said drag-taking abutments, said drag-taking abutments and said guide surfaces being so constructed and arranged that said pad assemblies are guided for movement substantially in a radial direction towards and away from the drum and all other movements of said pad assemblies with respect to said drum are precluded, two pairs of levers for applying said pad assemblies to said drum, each of said levers acting on a respective one of said pad assemblies, each lever having an inner end and an outer end, struts being provided between said inner ends of corresponding levers of each said pair to provide articulated connections therebetween, a fixed abutment provided on said drag-taking member for engagement by said outer ends of said levers of one pair, and equalising actuating means acting on said levers to equalise the radial components of the brake applying forces applied to said pad assemblies, said actuating means acting on said outer ends of said levers of the other of said pairs to separate the same.

2. A brake as claimed in claim 1, wherein said struts have rocking engagements with said inner ends of said levers, and steadies restrain said struts against movement in a radial direction.

* * * * *